United States Patent
Decker et al.

(10) Patent No.: US 6,562,926 B1
(45) Date of Patent: May 13, 2003

(54) METHOD FOR PRODUCING WATER-SOLUBLE POLYMERS, COMPRISING OLIGOALKYLENE-IMINE SIDE CHAINS

(75) Inventors: Jürgen Decker, Speyer (DE); Stefan Frenzel, Mannheim (DE); Martin Rübenacker, Altrip (DE); Hubert Meixner, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/129,113

(22) PCT Filed: Nov. 17, 2000

(86) PCT No.: PCT/EP00/11438

§ 371 (c)(1),
(2), (4) Date: May 13, 2002

(87) PCT Pub. No.: WO01/36500

PCT Pub. Date: May 25, 2001

(30) Foreign Application Priority Data

Nov. 19, 1999 (DE) .......................... 199 55 804

(51) Int. Cl.$^7$ .............................. C08F 126/00
(52) U.S. Cl. ................. 526/312; 526/307.5; 526/307.7; 526/320; 526/307.3; 524/829; 524/831; 524/832

(58) Field of Search ........................... 526/307.3, 307.5, 526/307.7, 312, 320; 524/829, 831, 832

(56) References Cited

U.S. PATENT DOCUMENTS

| | | | |
|---|---|---|---|
| 3,280,218 A | 10/1966 | Endsley et al. | |
| 4,060,678 A | 11/1977 | Steckler | |

FOREIGN PATENT DOCUMENTS

| | | |
|---|---|---|
| EP | 0 411 654 | 2/1991 |
| EP | 0 387 567 | 5/1996 |

*Primary Examiner*—Helen L. Pezzuto
(74) *Attorney, Agent, or Firm*—Oblon, Spivak, McClelland, Maier & Neustadt, P.C.

(57) ABSTRACT

The invention relates to a method for producing water-soluble homopolymers and copolymers, comprising oligoalkylene-imine side chains of the general formula (I), wherein $[AI]_m$, m, Y and x have the definitions given in claim 1, by radical homopolymerisation or copolymerisation of monomers A of the general formula (II), wherein $[AI]_m$, m, n, Y and R have the definitions given in claim 1, in an aqueous reaction medium. The invention also relates to the homopolymers and copolymers obtained by this method and to their use as auxiliary agents in paper production.

19 Claims, No Drawings

METHOD FOR PRODUCING WATER-SOLUBLE POLYMERS, COMPRISING OLIGOALKYLENE-IMINE SIDE CHAINS

The present invention relates to a process for preparing water-soluble homopolymers and copolymers having oligoalkyleneimine side chains of the general formula I,

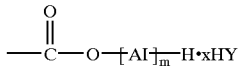

(I)

where

is a linear or branched oligoalkyleneimine chain comprising m alkyleneimine units, where
m is an integer from 1 to 20, and the number average of m in the oligoalkyleneimine side chains is at least 1.5,
Y is the anion equivalent of a mineral acid, and
x is $0 \leq x \leq m$,
and to the copolymers obtained by this process and their use as auxiliaries in papermaking.

In papermaking, in particular in papermaking under neutral conditions, polymers having basic amino groups, the acid addition salts thereof or amino-containing, amphoteric polymers are often employed. They are often used as fixing agents and as drainage aids, flocculents and retention aids.

U.S. Pat. No. 3,280,218 describes graft polymers having polyalkyleneimine side chains. These polymers are prepared by reacting polyacrylic acid as grafting base with a large excess of ethyleneimine. A disadvantage of this process is the high ethyleneimine requirement. Polymers free from acid groups cannot be prepared by this route, since some of the carboxylate groups do not react owing to steric effects. Furthermore, other functional groups cannot be introduced into the polymer in this manner.

EP-A 387 567 describes polymers which are obtainable by reacting a carboxyl-containing, water-soluble polymer with ethyleneimine. This process provides polymers having oligomeric alkyleneimine side chains and molecular weights of up to 1,000,000. As a consequence of their method of preparation, such polymers likewise necessarily contain carboxylic acid groups. The amphoteric polymers described in this reference are used as flocculents and drainage aids in papermaking.

Likewise, EP-A 411 654 describes amphoteric polymers having aminoalkylene side groups. Similar to EP-A 387 567, they are preferably prepared by reacting a carboxyl-containing, water-soluble polymer with ethyleneimine. The polymer likewise necessarily contains acid groups.

One disadvantage of the preparation methods described in the prior art is that acid-free polymers having oligoalkyleneimine side chains cannot be prepared in this manner. Furthermore, the molecular weight of the polymers obtainable in this manner depends on the molecular weight of the grafting base used. There is an upper limit for the latter molecular weight, since otherwise this causes viscosity problems that inhibit or even prevent the reaction with the ethyleneimine. Furthermore, it has been observed that relatively high molecular weights of the grafting base lead to gel formation, even at low ethyleneimine conversions, thus also limiting the maximum achievable molecular weight. This method does not permit controlled adjustment of chain lengths with the oligomeric alkyleneimine side chains either.

We have found, surprisingly, that water-soluble polymers having oligoalkyleneimine side chains of the general formula I defined at the beginning can be prepared by polymerizing at least one ester of the formula II which can also be used in the form of an oligomer mixture,

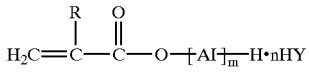

(II)

and where

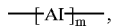, m and Y are as defined above, the number average of m in the oligomer mixtures of II being at least 1.5,
R is hydrogen or $C_1$–$C_4$-alkyl, and
n is $1 \leq n \leq m$,
alone or together with other monomers in water using free-radical polymerization initiators, and that this process yields polymers which meet the requirements made on paper auxiliaries to a particular extent. If polymerized on its own, monomers A yield homopolymers which have oligoalkyleneimine side chains of the formula I, are acid-free and have a particularly high cationic charge density.

The present invention therefore provides a process for preparing water-soluble homopolymers or copolymers having oligoalkyleneimine side chains of the general formula I defined at the beginning, which comprises polymerizing ethylenically unsaturated monomers M, comprising:
- at least one monomer A of the above-defined general formula II or an oligomer mixture of monomers of this type and
- optionally one or more water-soluble monomers B which are different from said monomers A and/or monomers C which are different from said monomers A and B,
- in an aqueous polymerization medium in the presence of an initiator which triggers the free-radical polymerization of the monomers M.

Linear oligoalkyleneimine structural units

are best described by the following structural formula Ia

(Ia)

where m is as defined above and R' and R" are monovalent organic radicals, such as $C_1$–$C_4$-alkyl or phenyl, or hydrogen. R' and R" are preferably hydrogen.

Branched oligoalkyleneimine structural units

can be described, for example, by the following structural formula Ib

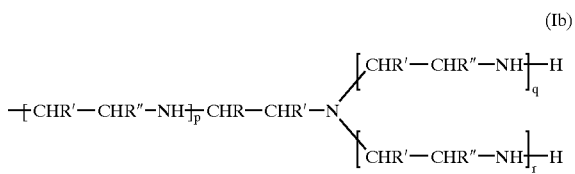

where p is 0 or an integer 1, 2, 3 ... which is different from 0, q and r are each, independently of one another, integers which are different from 0, and the sum p+q+r+1=m. Ib represents a singly branched oligoalkyleneimine unit

It will be appreciated that the present invention also covers the preparation of polymers in which the oligoalkyleneimine unit

is branched more than once.

The monomers A of the general formula II are usually oligomer mixtures of such compounds. In this case, m represents the number of ethyleneimine repeating units in the respective molecules of the general formula II; according to the invention, m in these molecules is from 1 to 20 and preferably from 1 to 10. According to the invention, the composition of the oligomer mixtures of compounds of the general formula II is selected such that the number average of m in these mixtures is at least 1.5, preferably at least 2.1, and is, for example, in the range from 1.5 to 15, preferably in the range from 2.1 to 8 and in particular in the range from 2.5 to 4.5. According to the invention, preference is given to those oligomer mixtures which comprise less than 25% by weight of compounds of the general formula II where m=1. If monomers A in the form of chemically uniform compounds of the general formula II are used, m is naturally at least 2, so as to ensure a number average of m in the range of at least 1.5.

In the monomers of the general formula II, at least one of the nitrogen atoms contained therein, preferably more than one or all of the nitrogen atoms contained therein, are present in protonated form. The monomers A are thus formally acid addition compounds. The anion equivalents required for charge neutrality are usually derived from low molecular weight acids, in particular from mineral acids such as hydrochloric acid, sulfuric acid or nitric acid. This means that Y— is preferably Cl—, $HSO_4$—, ½ $SO_4^{2-}$—, $NO_3$—, $H_2PO_4$—, ½ $HPO_4^{2-}$ or ⅓ $PO_4^{3-}$—. Particularly preferably, Y— is Cl—, ½ $SO_4^{2-}$— and $NO_3$— and in particular Cl—.

Provided that the number average of m≧2.1, the number average of n is preferably at least 2.

In the formula II, R is preferably hydrogen or in particular methyl. R and R' in the formulae Ia and Ib are preferably hydrogen.

Preference is given to using the monomers A in the form of oligomer mixtures of the formula II. In this case, preference is given to those oligomer mixtures which comprise less than 25% by weight of compounds of the formula II where m=1. This is usually the case when the average value of $\overline{m}$≧2.1.

According to the invention, at least one further water-soluble monomer B, which is different from the monomers A, can be copolymerized together with the monomer A. The solubility of the monomer B in water is typically at least 50 g/l at 25° C. and in particular at least 100 g/l at 25° C. and 1 bar. The monomers B comprise neutral monomers (monomers B1), acidic monomers (monomers B2) and/or cationic monomers (monomers B3).

Examples of neutral monomers B1 are amides of monoethylenically unsaturated carboxylic acids, e.g. acrylamide and methacrylamide, hydroxyalkyl esters of ethylenically unsaturated carboxylic acids, e.g. hydroxyethyl acrylate, hydroxyethyl methacrylate, 2- or 3-hydroxypropyl acrylate, 2- or 3-hydroxypropyl methacrylate, 4-hydroxybutyl acrylate and 4-hydroxybutyl methacrylate, esters of monoethylenically unsaturated carboxylic acids with polyalkylene glycols or monoalkyl ethers of polyethylene glycols, e.g. esters of acrylic acid or methacrylic acid with polyethylene glycol, polypropylene glycol, polyethylene glycol/polypropylene glycol block copolymers, and acrylonitrile or methacrylonitrile.

Further monomers B1 are N-vinyllactams such as N-vinylpyrrolidone and N-vinylcaprolactam, open-chain N-vinylamides such as N-vinylformamide, and vinylimidazole and 2-methyl-1-vinylimidazole.

Examples of B2 are monoethylenically unsaturated monocarboxylic acids and monoethylenically unsaturated dicarboxylic acids such as acrylic acid, methacrylic acid, crotonic acid, isocrotonic acid, acrylamidoglycolic acid, maleic acid, itaconic acid, citraconic acid; and monoethylenically unsaturated sulfonic acids such as vinylsulfonic acid, allylsulfonic acid, methallylsulfonic acid, styrenesulfonic acid or acrylamidomethylpropanesulfonic acid or salts thereof, in particular sodium salts thereof, monoethylenically unsaturated phosphonic acids or phosphoric acids such as vinylphosphonic acid, allylphosphonic acid, methallylphosphonic acid, acryloxyethylphosphonic acid, acryloxyethylphosphoric esters, methacryloxyethylphosphonic acid or methacryloxyethylphosphoric esters or salts thereof, in particular sodium salts or ammonium salts thereof.

Examples of cationic monomers B3 are quaternization products of N-vinylimidazole, of aminoalkylamides and aminoalkyl esters of monoethylenically unsaturated carboxylic acids, e.g. dimethylaminoethylacrylate quaternized with dimethyl sulfate or methyl chloride, quaternized dimethylaminoethylmethacrylate, dimethylaminopropylacrylamide and dimethylaminopropylmethacrylamide.

In a particular embodiment of the present invention, from 5 to 50% by weight, in particular from 10 to 40% by weight, of monomers A and from 50 to 95% by weight, in particular from 60 to 90% by weight, of monomers B are used in the preparation of the polymers of the invention.

Preferred monomers B are neutral, water-soluble monomers B1, in particular amides of monoethylenically unsaturated monocarboxylic acids, open-chain vinylamides such as N-vinylformamide and N-vinyllactams, in particular acrylamide and methacrylamide and most preferably acrylamide as sole monomer B.

It is thus preferred for the monomers B to be polymerized to comprise less than 20% by weight and in particular less than 10% by weight, based on the total weight of the monomers M to be polymerized, of monomers B2 or monomers B3.

In the process of the invention, it is of course also possible to copolymerize, in addition to the monomers A and the monomers B, other monomers C which are different from the monomers A and monomers B. If desired, monomers C are typically used in the process of the invention in an amount of up to 40% by weight, e.g. in an amount of from 0.01 to 40% by weight. However, in preferred embodiments of the process of the invention, monomers C will be used in an amount of not more than 30% by weight, in particular of not more than 20% by weight, and particularly preferably of not more than 10% by weight. In a particularly preferred embodiment of the process of the invention, no monomers C are used.

Monomers C include diethylenically or polyethylenically unsaturated monomers C1. These monomers cause crosslinking of the growing polymer change during the polymerization and thus an increase in the molecular weight of the water-soluble polymers of the invention. Crosslinking monomers are typically used in an amount of from 1 to 10,000 ppm, in particular in an amount of from 1 to 1000 ppm, in each case based on the total monomer amount. Examples of crosslinking monomers C1 are esters of acrylic acid or methacrylic acid with polyols such as butanediol diacrylate, trimethylolpropane triacrylate, tri- and tetraethylene glycol diacrylate, and the corresponding methacrylates and the corresponding vinyl ethers and allyl ethers of the abovementioned diols or polyols. Further examples of monomers C1 are N,N'-divinylurea, N,N'-divinylimidazolidone, methylenebisacrylamide and allyl methacrylate, diallyl phthalate and divinylbenzene. Preference is given to those monomers C1 which have a solubility in water of >50 g/l at 25° C.

The abovementioned monomers C1 are usually used together with chain transfer agents (regulators). The amount of chain transfer agent used naturally depends on the efficiency of the chain transfer agent and usually is in the range from 0.0001 to 5% by weight, based on the total monomer amount. Examples of chain transfer agents are: aliphatic mercaptans such as $C_6$–$C_{12}$-alkylmercaptans, such as n-hexylmercaptan, n-octylmercaptan, tert-octylmercaptan, 2-ethylhexylmercaptan, n-decylmercaptan, 2-propylheptylmercaptan, n-dodecylmercaptan and tert-dodecylmercaptan; water-soluble mercaptans such as 2-mercaptoethanol, mercaptopropanol, mercaptobutanol, mercaptopropionic acid and mercaptoacetic acid, and formic acid, isopropanol, allyl alcohols, aldehydes such as butyraldehyde, halogenated hydrocarbons such as chloroform, bromoform, carbon tetrachloride and the like.

In the process of the invention, it is of course also possible to copolymerize other monomers C which are different from the abovementioned monomers (monomers C2). The monomers C2 are monomers which can be copolymerized with the abovementioned monomers in an aqueous reaction medium, for example vinyl esters of aliphatic $C_1$–$C_4$-monocarboxylic acids such as vinyl formate, vinyl acetate, vinyl propionate and vinyl butyrate, esters of acrylic acid or methacrylic acid with $C_1$–$C_4$-alkanols such as methyl acrylate, methyl methacrylate, ethyl acrylate and propyl acrylate, vinylaromatic monomers such as styrene and α-methylstyrene; and esters of acrylic acid and methacrylic acid with long-chain alkanols such as lauryl (meth)acrylate and stearyl (meth)acrylate. The monomers C2 are usually used in an amount of up to 20% by weight, e.g. from 0.1 to 20% by weight. In a preferred embodiment of the process of the invention, no monomers C2 are used in the preparation of the copolymers of the invention.

According to the invention, the monomers A, B and optionally C are polymerized in an aqueous polymerization medium. An aqueous polymerization medium is to be understood as water and mixtures of water and a water-miscible solvent, the amount of solvent being less than 20% by weight, based on the total amount of solvent and water. Examples of water-miscible solvents are $C_1$–$C_4$-alkanols such as methanol, ethanol, n-propanol, isopropanol, n-butanol or tert-butanol, and open-chain or cyclic amides such as acetamide, N,N-dimethylacetamide, N,N-dimethylformamide, N-methylpyrrolidone, and acetone and tetrahydrofuran. The aqueous reaction medium preferably contains less than 10% by weight, in particular less than 5% by weight, most preferably less than 2% by weight of water-miscible, organic solvent, and in particular none at all.

In a most preferred embodiment of the present invention, the polymerization is carried out in water.

The process of the invention can also be carried out in an aqueous polymerization medium which is present in emulsified form as a water-in-oil emulsion in a liquid organic medium which in turn is inert under the polymerization conditions. The actual polymerization takes place in the water droplets, so that polymerization conditions apply which are essentially similar to conventional polymerization in aqueous polymerization media.

Examples of organic liquids, which are not miscible with water and are inert under polymerization conditions, are aliphatic hydrocarbons, e.g. $C_5$–$C_{12}$-alkanes such as pentane, hexane, octane, isooctane, decane, dodecane, paraffins and isoparaffins, cycloalkanes such as cyclohexane, cyclohexanes substituted with $C_1$–$C_4$-alkyl, cycloheptane, cyclooctane, perchlorinated hydrocarbons such as perchloroethylene, 1,1,1-trichloromethane and aromatic hydrocarbons such as benzene, toluene, ethylbenzene, xylenes, cumenes etc. Preferred organic liquids are mixtures of saturated hydrocarbons, essentially consisting of n-paraffins and isoparaffins and containing up to 20% by weight of naphthenes. The proportion of the water-immiscible organic liquid in the water-in-oil emulsion is usually in the range from 30 to 90% by weight.

The water droplets in the inert organic liquid are usually stabilized by using surfactants which are suitable for water-in-oil emulsions, for example esters of glycerin or sorbitan with fatty acids such as sorbitan monooleate, sorbitan monostearate, sorbitan monopalmitate, sorbitan monolaurate, glycerol sorbitan fatty esters, ethoxylation products of glycerol sorbitan fatty esters, and mannitol fatty esters such as mannitol monooleate, salts of monoesters of phthalic acid with fatty alcohols such as sodium hexadecyl phthalate, sodium cetyl phthalate, sodium stearyl phthalate, metal soaps such as magnesium, calcium, lithium, zinc or aluminum lanolate, stearate, laurate; polyethylene oxides, polypropylene oxides and ethylene oxide/propylene oxide block copolymers, ethoxylated fatty alcohols and ethoxylated ethers of glycerol with 1 or 2 mol of fatty alcohol (cf. EP-A 374 646). Further surfactants suitable for stabilizing water-in-oil emulsions are known from the literature and can be taken from "Das Atlas HLB-System" Atlas-Chemie 1968, or determined by means of the criteria cited therein. The surfactants are usually used in an amount of from 0.1 to 10% by weight, based on the amount of organic liquid.

Processes for polymerizing water-soluble, ethylenically unsaturated monomers in an aqueous polymerization medium, which is present in the form of a water-in-oil emulsion in an organic liquid, have been described in various instances in the prior art, for example in Houben-Weyl, Methoden der Organischen Chemie, 4th edition, Vol. E20, p. 1182–1184, DE-AS 1081228, DE-AS 1081173, K. E. J. Barret et al., Dispersion Polymerization in Organic Media, London 1975, p. 115, EP-A 231 901, EP-A 262 577, EP-A 264 649, EP-A 374 646 and in U.S. Pat. No. 3,284,393. The teachings given therein can be applied to the polymerization of the monomers A and B, so that the contents of these references are incorporated herein by reference.

The initiators are in principle any compounds which can trigger a free-radical polymerization of ethylenically unsaturated monomers. Examples of initiators are azo compounds, organic or inorganic peroxides, peroxodisulfuric acid salts and redox initiator systems. In the process of the invention, the initiator is usually employed in an amount of from 0.01 to 5% by weight, preferably in an amount of from 0.05 to 2% by weight, and in particular in an amount of from 0.1 to 1% by weight, based on the amount of monomers to be polymerized. The amount of initiator used depends, as is known, on the efficiency with which the initiator triggers the free-radical polymerization of the monomers. When the polymerization is carried out in a water-in-oil emulsion, the initiator amounts will often be lower, in particular when using hydrophobic initiators. In this case, the amounts of initiator used are, for example, from 0.01 to 1% by weight and in particular from 0.01 to 0.2% by weight, based on the monomers A, B and C used. It is of course also possible to trigger the polymerization by actinic radiation.

Examples of azo initiators are 2,2'-azobisisobutyronitrile, 2,2'-azobis(2,4-dimethylvaleronitrile), 2,2'-azobis(2-amidinopropane) dihydrochloride and 2,2'-azobis(2-(2-imidazolin-2-yl)propane) dihydrochloride. Examples of inorganic peroxides are hydrogen peroxide and percarbonate, examples of organic peroxides are alkyl hydroperoxides such as tert-butyl hydroperoxide, cumene hydroperoxide, and peroxycarboxylic acid esters such as tert-butyl peroctoate and diacyl peroxides such as dibenzoyl peroxide. Suitable peroxodisulfuric acid salts are in particular sodium, potassium and ammonium salts. Examples of redox initiator systems are systems comprising one of the abovementioned organic or inorganic peroxides, in particular hydrogen peroxide, as oxidation component, and at least one further reduction component such as ascorbic acid, hydroxylamine or adducts of sulfurous acid and aldehydes, e.g. the bisulfite adduct of acetone or the sodium salt of hydroxymethanesulfinic acid, as reducing agent. Both the abovementioned peroxides and the redox initiator systems can be used in the presence of redox-active transition metals such as iron, vanadium or copper, preferably in the form of water-soluble salts.

If the polymerization is carried out in water, preference is given to employing water-soluble initiator systems such as hydrogen peroxide, tert-butyl peroxide or salt-like azo compounds, e.g. the abovementioned hydrochlorides. If the polymerization is carried out in the water-in-oil emulsion described above, the hydrophobic initiators are at least as good as the water-soluble initiators, or even better. Examples of hydrophobic initiators are bisazo(alkylnitriles) such as 2,2'-azobis(valeronitrile), 2,2'-azobis(2,4-dimethylvaleronitrile), 2,2'-azobis(4-methoxy-2,4-dimethylvaleronitrile), 2,2'-azobis(isobutyronitrile); alkyl and cycloalkyl percarbonates such as dicyclohexyl peroxodicarbonate, di-2-ethylhexyl peroxodicarbonate, tert-butyl peroxoisopropylcarbonate; diacylperoxides such as acetyl peroxide, dioctanoyl peroxide, dilauroyl peroxide, dibenzoyl peroxide; peroxy esters, in particular tert-butyl peroxycarboxylic esters such as tert-butyl perpivalate, per-2-ethylhexanoate, perneodecanoate; hydroperoxides such as cumene hydroperoxide, p-menthane hydroperoxide, pinane hydroperoxide and tert-butyl hydroperoxide and peroxides such as dicumene peroxide, di-tert-butyl peroxide and di-tert-amyl peroxide.

The polymerization temperature usually depends on the initiator system used and is often in the range from 20 to 110° C. and in particular in the range from 25 to 80° C.

The polymerization time is usually in the range from 1 to 10 h.

The pH of the aqueous reaction medium is preferably in the range from pH 0 to pH 6, in particular in the range from pH 1 to pH 4.

The reaction can be carried out in the form of a batch process, where the monomers to be polymerized are initially charged in the aqueous reaction medium and the polymerization initiator is added under polymerization conditions, preferably at the rate at which it is consumed, or initially charged in the polymerization vessel together with the monomers and subsequently heated to the polymerization temperature.

It is of course also possible to conduct the polymerization as a feed process. In the feed process, at least part of the monomers to be polymerized, preferably at least 80% and in particular virtually the total amount of the monomers to be polymerized, is introduced into the polymerization reactor under polymerization conditions. In this process, the polymerization initiator is preferably introduced into the polymerization reaction in parallel with the addition of the monomers. Preference is given to introducing the monomers into the polymerization reaction, depending on the type of polymerization method desired, in the form of an aqueous solution or in the form of a water-in-oil emulsion.

The process of the invention yields homopolymers and copolymers having oligoalkyleneimine side chains of the general formula I whose molecular composition is essentially the same as the composition of the monomers used.

The present invention provides on the one hand homopolymers of monomers A. They usually have a weight average molecular weight Mw in the range from 100,000 to 3,000,000. The K value of a 0.1% strength by weight solution (measured in 5% strength NaCl solution at 25° C.) is usually at least 60, preferably at least 90. Homopolymers of this type have no acid groups and therefore usually a higher cationic charge density than the prior art polymers which are obtainable by polymer-analogous reaction of polyacrylic acids with alkyleneimines. The cationic charge density of the novel homopolymers of the monomers A is at least 4 meq/g even at pH 7, preference being given to homopolymers having a cationic charge density >4 meq/g, preferably >5 meq/g, at pH 7. The stated cationic charge density is the number of protonated nitrogen atoms per gram of polymer, as can be determined by titration with potassium polyvinylsulfate according to the method described by D. Horn, Progr. Colloid u. Polymer Sci. 65 (1978) 251.

On the other hand the invention provides copolymers of the monomers A with the monomers B and/or C. A distinction is made here between those copolymers which comprise the monomers A as main component and those copolymers which comprise the monomers B as main component.

In the latter copolymers, the polymerized monomers M comprise:
from 5 to 50% by weight, in particular from 10 to 40% by weight, of monomers A,
from 50 to 95% by weight, in particular from 10 to 60% by weight, of at least one monomer B, preferably at least one or more of the monomers B indicated as preferred and in particular of acrylamide as monomer B, and
from 0 to 40% by weight of monomers C which are different from said monomers A and B.

In the former copolymers, the polymerized monomers M comprise:
from 50 to 100% by weight of monomers A, and at least one further monomer selected from from 0 to 50% by weight of one or more monomers B, and from 0 to 40% by weight of monomers C which are different from said monomers A and B.

The copolymers of the monomers A, B and/or C, in particular the copolymers of the monomers A and B, usually have a weight average molecular weight $M_w$ of at least 2,000,000 (determined by light scattering of a solution of 0.1 g of the polymer in 0.1 n NaCl solution). The present invention also provides copolymers of this type.

The weight average molecular weight $M_w$ of the copolymers is often at least 3,000,000. It can likewise be 5,000,000 or more, e.g. 15,000,000 or up to 25,000,000.

The preferred weight average molecular weights $M_w$ of the copolymers correspond to a Fickentscherr K value (measured as 0.1% strength by weight solution of the polymer in 5% strength by weight NaCl solution at 25° C.) of at least 140, preferably at least 150, and in particular at least 160.

The Brookfield viscosity of 1% strength by weight solutions of the copolymers at 25° C. is usually more than 100, preferably more than 200, in particular more than 500, mPas. With regard to their use as auxiliaries in papermaking, high molecular weight products are preferred.

The molecular composition of the copolymers of the invention naturally corresponds to the type and composition of the respective mixture of monomers A and B and/or C. The process of the invention usually yields random copolymers, i.e. the structural units derived from the monomers A, B and/or C are randomly distributed over the carbon chain of the polymeric backbone.

With regard to their use as retention aids, those polymers are preferred which contain polymerized monomers A, B and C in the weight percentages indicated above as preferred. Thus, those copolymers are particularly preferred which have from 5 to 50% by weight, in particular from 10 to 40% by weight, and particularly preferably from 10 to 35% by weight, of structural units derived from monomers A. The proportion of structural units derived from monomers B is preferably from 50 to 95% by weight, in particular from 60 to 90% by weight and particularly preferably from 65 to 90% by weight, based on the total weight of the copolymer. In preferred copolymers, the proportion of structural elements having acid groups derived from monomers B2 is preferably less than 20% by weight and in particular less than 10% by weight. Of these, particular preference is given to those copolymers which comprise, in addition to monomers A and optionally C, exclusively structural elements B derived from neutral monomers B, in particular from open-chain N-vinylamides, N-vinyllactams and amides of ethylenically unsaturated carboxylic acids and particularly preferably of acrylamide or methacrylamide.

The proportion of structural elements derived from monomers C preferably corresponds to the proportions of monomers C indicated above as preferred, based on the monomers M to be polymerized. In preferred embodiments, the copolymers of the invention contain no structural elements derived from monomers C or only small amounts of structural elements derived from monomers C1.

Furthermore, those homopolymers and copolymers are preferred which have oligomeric alkyleneimine side chains of the general formula I and have an average degree of oligomerization of >2 which in particular does not exceed 8. The number average of m, based on all oligoalkyleneimine side chains of the formula I present in the polymer, is thus preferably in the range from 2.1 to 8. Particular preference is given to those polymers in which the number average m is in the range from 2.5 to 4.5.

Furthermore, it is preferred according to the invention if the proportion of structural units having an alkyleneimine side chain (side chain of formula I where m=1) comprises less than 25% by weight, based on the total amount of structural units having oligoalkyleneimine side chains in the homopolymers and copolymers.

The homopolymers and copolymers of the invention are obtained in the form of aqueous solutions or a water-in-oil emulsion, from which the aqueous polymer solution can be separated in accordance with known procedures. The polymers of the invention are present in these solutions, depending on the pH of the aqueous solution, in unprotonated form (i.e. x=0), in partially protonated form or in completely protonated form. For reasons of stability, the pH is often selected such that the nitrogen atoms in the oligoalkyleneimine side chains of the polymers of the invention are present in at least partially protonated form, preferably in a proportion of at least 25% by weight and in particular of at least 50% by weight (i.e. $x \geq 0.25 \overline{m}$ and in particular $x \geq 0.5 \overline{m}$, where $\overline{m}$ is the number average of m).

The polymer content in the aqueous solutions (calculated as unprotonated polymer) depends on the type of preparation and is usually in the range from 1 to 50% by weight, preferably in the range from 2 to 40% by weight. The preparation of the polymers by polymerization in a water-in-oil emulsion as reaction medium often yields solutions having solid contents $\geq 20\%$ by weight, in particular $\geq 30\%$ by weight, as the polymerization in a homogeneous aqueous polymerization medium usually yields polymer solutions having polymer contents of <20% by weight, e.g. from 2 to 15% by weight.

A further aspect of the present invention relates to the above-defined ethylenically unsaturated monomers A of the general formula II, in particular in the form of oligomer mixtures, in which the average $\overline{m}$ is at least 2.1 and in particular in the range from 2.1 to 8. Monomers of this type are of particular interest as commercial forms. Of the oligomer mixtures of compounds of the formula II, those oligomer mixtures are preferred in which the proportion of compounds of the general formula II where m=1 is less than 25% by weight, based on the total amount of compounds of the general formula II. Particular preference is given to those monomers of the general formula II, in which

is derived from ethyleneimine. R is preferably hydrogen or methyl, in particular methyl.

Monomers A of the general formula II can be prepared by reacting an ethylenically unsaturated carboxylic acid of the general formula III

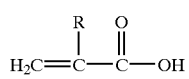

(III)

where R is as defined above, in particular hydrogen or methyl, with an oligoalkyleneimine, preferably in the form of an oligomer mixture, of the general formula IV

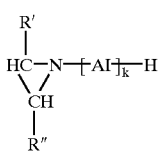

where R' and R" are as defined above, in particular hydrogen,

is a linear or branched oligoalkyleneimine chain and k is m−1, and subsequently converting the resulting product with a mineral acid HY in the acid addition salt of the general formula II.

Preference is given to using the carboxylic acid of the general formula III in at least equimolar amounts, in particular in a molar excess, based on the nitrogen atoms of the compound IV. In particular, the molar ratios III:IV are selected such that the molar ratio of III to the number of nitrogen atoms in IV is in the range from 1.5:1 to about 20:1.

Examples of suitable mineral acids HY are HCl, $H_2SO_4$ and $H_3PO_4$ or $HNO_3$.

The preparation can be carried out both in an aqueous reaction medium of the type described above and in an inert organic solvent, preferably a hydrocarbon, in particular an aliphatic hydrocarbon having up to 12 carbon atoms.

The reaction of III with IV is preferably carried out in the absence of oxygen, i.e. under an inert gas atmosphere (e.g. nitrogen or argon) and/or in the presence of customary acrylate stabilizers, e.g. quinones such as hydroquinone monomethyl ester.

In the typical reaction of III with IV, the compound of the general formula IV is added, continuously or batchwise at the reaction temperature, to a solution of the acid of the general formula III in the desired solvent. The reaction temperatures for this reaction are usually in the range from 10 to 100° C., in particular in the range from 30 to 70° C. The acid HY is preferably added after cooling of the reaction mixture to room temperature. Preferred mineral acids HY are the acids mentioned above: hydrochloric acid, sulfuric acid, phosphoric acid and nitric acid, particular preference being given to hydrochloric acid and sulfuric acid. When working in an organic reaction medium, use is often made of gaseous HCl. For further details of the reaction of compounds III and IV reference is made to U.S. Pat. No. 3,336,358 and DE-A 41 30 919, in which the reaction of methacrylic acid with ethyleneimine is described. The reaction conditions cited therein are directly applicable to the preparation of the novel esters of the general formula II, so that these references are incorporated herein by reference.

When the reaction is conducted in an aqueous reaction medium, aqueous solutions of compounds of the general formula II are obtained—depending on the starting material IV in the form of pure compounds or oligomer mixtures—which still contain the excess acid III. This acid is preferably separated in the process of the invention prior to using II. However, if polymers comprising acid groups are desired, the acid III may completely or partially remain in the solution. The acid III is separated by generally known methods, e.g. by extraction or distillation. The resulting aqueous solutions of compounds of the formula II can be employed directly in the polymerization process of the invention.

When the reaction of compounds of the general formula III with compounds of the general formula IV is conducted in an apolar, organic solvent, the compound of the general formula II precipitates in the form of a solid, whereas the acid III usually remains dissolved in the organic solvent. It will be appreciated that the acid III can be recovered from the organic solvent and returned to the reaction with IV.

The solutions of the monomers A of formula II, especially the aqueous solutions, are particularly interesting, as they may be utilized directly in the process according to the invention. An elaborate isolation of these compounds is therefore not required. The solutions of these compounds II and in particular their aqueous solutions are commercially particularly interesting and they are, thus, an object of this invention.

In order to stabilize compounds II, in particular in view of any undesireable polymerization reactions, preferably a stabilizer is added to the solutions, in particular to the aqueous solutions. The stabilizers in question are, for example, Broenstedt acids and preferably the HY acids forming the acid addition salt. In particular these are hydrochloric acid, formic acid and sulphuric acid. If such acids are used, the solution to be stabilized is preferably stabilized with at least 1, preferably at least 1.5 and most preferably with at least 1.8, for example 2, acid equivalents, per mole of compound II.

The stabilizers used are particularly those compounds acting as antioxidant and or as a radical trap. Among these are the compounds having nitroxyl radicals, such as 2,2,6, 6-tetramethyl piperidine-N-oxyl (TEMPO), 4-hydroxy-TEMPO; amino phenols, such as 2-amino phenol; hydroxy phenols, hydroxy phenols substituted by alkyl, their monoalkyl ethers, such as methylhydroquinone, hydroquinone monomethyl ether, hydroquinone monobenzyl ether, 4-tert-butylcatechol; also phenothiazine and substituted phenothiazines; as well as sodium bisulfites. Such compounds are preferably added in amounts of 10 to 1000 ppm, more preferably 100 to 900 ppm and in particular 200 to 500 ppm, based on the weight parts of compounds II in the aqueous solution to be stabilized.

The compounds of the general formula IV which are used as starting materials for the preparation of II and have an intact aziridine ring can be obtained by controlled oligomerization of aziridines of the general formula V,

where R' and R" are as defined above.

The oligomerization is conducted in the presence of catalytic amounts of a Brönstedt acid or a Lewis acid. Examples of Lewis acids are trialkylaluminum compounds. Preference is given to Brönsted acids having a pKa of <1, for example the abovementioned mineral acids, in particular hydrochloric acid or sulfuric acid, or strong organic acids such as p-toluenesulfonic acid, trifluoromethanesulfonic acid, trichloroacetic acid or trifluoroacetic acid. The amount of acid is usually in the range from 0.05 to 5% by weight, in particular in the range from 0.1 to 2% by weight, based on aziridine of the general formula V used.

The reaction is usually conducted at temperatures above room temperature, preferably at temperatures in the range from 30° C. to 80° C. Temperatures higher than 100° C. are less preferred.

The reaction can be conducted in one of the abovementioned aqueous reaction media or in an organic solvent which is inert under the reaction conditions. Examples of suitable organic solvents are $C_1$–$C_4$-alcohols, in particular methanol or ethanol, dialkyl ethers such as diethyl ether and aliphatic and aromatic hydrocarbons. Particularly preferred organic solvents are aliphatic hydrocarbons having up to 12 carbon atoms. The reaction usually involves slowly introducing the catalyst and a solution of the aziridine of the general formula V in the desired solvent into the reaction vessel under reaction conditions. The reaction vessel usually contains part of the solvent. The reaction time is usually between 3 min and 10 h. The reaction is usually stopped by neutralizing the acid with a small excess of a strong base, for example an alkali metal hydroxide or an alkali metal carbonate, in particular with aqueous sodium hydroxide.

The reaction can be carried out batchwise or continuously. The continuous reaction can be conducted in the reactors customary for this purpose, preferably in tube reactors or tube bundle reactors. In a typical continuous preparation, a solution of the aziridine of the formula V is mixed with a solution of the desired catalyst in the desired proportions and the resulting mixture is introduced into a reaction zone, for example a flow reactor heated to the reaction temperature, and the reactor effluent is cooled and subsequently neutralized with a base. The reaction time is preferably from 0.5 to 5 h in the case of the batch process and from 3 min to 30 min in the case of the continuous process.

The degree of oligomerization can be controlled in a simple manner via the reaction temperature and the reaction time, with an increase in temperature or a long reaction time leading to high degrees of oligomerization. Higher temperatures lead to more highly branched products IV.

The abovementioned processes produce solutions of the oligomers in the solvent used in each case. It is possible to isolate the oligomer of the general formula IV from this solvent. However, preference is given to using the solutions of the oligomers IV for the preparation of compounds of the general formula II without any further workup.

Another aspect of the present invention is the use of the water-soluble polymers of the present invention as auxiliaries in papermaking.

The novel water-soluble polymers having oligoalkyleneimine side chains of the general formula I are particularly suitable as draining aids, flocculents and retention aids and as fixing agents in papermaking. For this purpose, they are added to the respective paper stock in an amount of from 0.01 to 2% by weight, preferably in an amount of from 0.01 to 0.5% by weight, e.g. from 0.01 to 0.1% by weight, in each case based on the solids present in the paper stock.

In particular, the homopolymers and copolymers of the invention lead to an improved retention of fines compared to the prior art polymers. They have been found particularly useful in the retention of fillers such as calcium carbonate. The homopolymers are particularly known for their good fixing properties.

The water-soluble polymers of the invention can be used for making all grades of paper, paperboard and cardboard, for example paper for newsprint (letter press/offset printing), medium-fine writing and printing paper, imitation intaglio printing paper and also lightweight coating base paper. These grades of paper are produced from ground wood, thermomechanical pulp (TMP), chemothermomechanical pulp (CTMP), pressure ground wood (PGW) or sulfite or sulfate pulp, which may each be short- or long-fibered. Further suitable raw materials for the production of the paper stock are also chemical pulp and mechanical pulp, which are further processed in integrated mills directly in more or less moist form, without prior thickening or drying, to give the paper. Some of these materials still contain residual impurities from the digestion stage which greatly impair the conventional papermaking process. These impurities are particularly well fixed on the paper by the polymers of the invention.

The use of the polymers of the invention makes it possible to prepare both filler-free and filler-containing papers. The filler content of filler-containing papers can be up to a maximum of 40% by weight and is preferably in the range from 5 to 30% by weight. Examples of suitable fillers are clay, kaolin, chalk, talc, titanium dioxide, calcium sulfate, barium sulfate, aluminum oxide, satin white or mixtures thereof.

The good fixing action is particularly useful in the production of paper from waste paper and from material systems which contain interfering substances which accumulate in partially or completely closed water circulations of paper machines.

EXAMPLES

Analytical Methods

The viscosity was determined in accordance with Brookfield at 25° C. using a Brookfield viscometer and aqueous solutions of the polymers.

The average molecular weight was determined by light scattering by means of dynamic and static light scattering using an ALV goniometer and an ALV 5000 correlator. Solutions of the polymers in 0.1 molar NaCl solution were analyzed at 25° C. and a polymer concentration of 0.1–0.4 g/l.

The cationic charge density was determined by titration with potassium polyvinylsulfate in accordance with D. Horn, Progr. Colloid u. Polymer Sci. 65 (1978) 251.

The molecular weight of the oligomers of the general formula IV was determined titrimetrically by opening the aziridine ring in IV using an excess of HBr in glacial acetic acid and back-titration of the excess HBr with silver nitrate.

The K value of the polymers of the invention was determined in accordance with Fickentscher by measuring the viscosity of 0.1% strength by weight solutions of the polymers in 5% strength by weight NaCl solution.

II Preparation Examples

1. Oligomerization of Ethyleneimines to Give Oligomers of the Formula IV (Preparation Examples 1a to 1c)

Preparation Example 1a

A reactor equipped with a reflux condenser and 2 dropping funnels was charged with 55.8 g of water and heated to 55° C. At this temperature, 369.8 g of a 45% strength by weight aqueous solution of ethyleneimine and 44.0 g of a 3.4% strength by weight aqueous hydrochloric acid were introduced into the polymerization vessel in the course of one hour, beginning at the same time. The mixture was then held at this temperature for 3 h with stirring, cooled to room temperature and admixed with a solution of 1.82 g of NaOH in 4 g of water. 475 g of a 35% strength by weight aqueous solution of an ethyleneimine oligomer were obtained. The aziridine ring content, based on the oligomer, was 5.62 mmol/g. The average molecular weight calculated therefrom was 177 g/mol. This corresponds to an average $\overline{m}$ of about 4.1.

Preparation Example 1b (Continuous Oligomerization of Ethyleneimine in Water)

A tube reactor (600 cm length, 0.6 cm internal diameter, stainless steel) heated to 70° C. was fed in parallel via a static mixer with a 27% strength by weight aqueous ethyleneimine solution and a 4.83% strength by weight aqueous hydrochloric acid in a weight ratio of 11.2:1. The total volume flow was 1.13 kg/h. The reactor effluent was cooled to 10° C. and neutralized with a 10% strength by weight excess of aqueous sodium hydroxide solution via a static mixer. In this way, a 24.4% strength by weight aqueous solution of an ethyleneimine oligomer was obtained which had a titrimetrically determined aziridine ring content of 13.9 mmol/g. The number average molecular weight calculated therefrom was 72 g/mol (corresponding to an $\overline{m}$ value of 1.67).

Preparation Example 1c (Oligomerization of Ethyleneimine in Octane)

A reactor equipped with reflux condenser and 2 dropping funnels was charged with 40 g of n-octane and heated to 65° C. While maintaining the temperature, 360.2 g of a 55% strength by weight solution of ethyleneimine in n-octane and 96 g of a 1.2% strength by weight solution of $H_2SO_4$ in n-octane were added in the course of one hour, beginning at the same time. The mixture was maintained at this temperature for a further hour, cooled to room temperature and neutralized with a 10 mol % excess of aqueous sodium hydroxide solution, and resulting sodium sulfate was filtered off, yielding 495.8 g of a 40% strength by weight solution of the ethyleneimine oligomer in octane. The oligomer had an aziridine ring content of 6.49 mmol/g. The number average molecular weight calculated therefrom was 154 g/mol, corresponding to an $\overline{m}$ value of 3.58.

2. Preparation of Compounds of the General Formula II

Preparation Example 2a (Preparation in Water)

A reaction vessel equipped with a reflux condenser, a dropping funnel and a pH measurement device was charged with 254 g of methacrylic acid heated to 55° C. 130 g of the ethyleneimine oligomer solution obtained in Example 1b were then added dropwise in the course of 2 h. After a further 30 min at 55° C., the mixture was cooled to 15° C. and the mixture was adjusted to a pH of 1 using 68.7 g of a 37% strength by weight aqueous hydrochloric acid. 100 ml of n-octane were added, the phases were separated and the aqueous phase was washed five times with 50 ml of n-octane each time. In this way, 232 g of a 40.4% strength by weight aqueous solution of the oligoaminoethyl methacrylate hydrochloride (II) were obtained.

Preparation Example 2b (Reaction in n-Octane)

A reaction vessel equipped with a reflux condenser, a dropping funnel and a gas inlet was charged with 800 g of methacrylic acid and 800 g of octane and heated to 60° C. 496 g of the 40% strength by weight ethyleneimine oligomer solution in n-octane obtained in Example 1c were added in the course of 3 h. After addition was complete, the mixture was maintained at the abovementioned temperature for a further hour and cooled to 30° C. At this temperature, 175 g of gaseous HCl were introduced, leading to phase separation. After separation of the upper phase, which essentially consisted of octane and excess methacrylic acid, the lower phase was washed with 200 ml of octane. The semisolid lower phase was then stirred with 500 ml of acetone, yielding the compound of the general formula II in the form of its hydrochloride as a solid which was filtered off. The yield was 391.4 g.

3. Stabilization of the Solutions of Formula II

To improve the storage stability, the aqueous solutions were mixed with small amounts of phenothiazine or 4-tert-butylcatechol. By measuring the viscosity of the solutions and by means of gel permeation chromatography it was determined whether an increase in molecular weight took place which would indicate a decomposition of the compounds II. The unstabilized solution was used as a reference.

Stabilization Example 1 (Phenothiazine)

52.5 g of the 40% solution from example 2a were mixed with 34.3 mg of a 14.3% by weight solution of phenothiazine in acetone (corresponding to 4.9 mg of phenothiazine or 234 ppm, based on compound II) and stored at room temperature for 6 weeks.

Stabilization Example 2 (4-tert-Butylcatechol)

52.7 g of the 40% solution from example 2a were mixed with 16.6 mg of a 31% by weight solution of 4-tert-butylcatechol in acetone (corresponding to 5.2 mg of 4-tert-butylcatechol or 224 ppm, based on compound II) and stored at room temperature for 6 weeks.

In comparison to the reference sample, the samples from stabilizing examples 1 and 2 did neither show any increase in viscosity nor a change at GPC (chromatography at polyhydroxy methacrylate (HEMA-Bio of PSS GmbH, 14% aqueous formic acid as eluting agent) in the limits of measuring tolerances, which indicates the nonoccurence of an undesired increase in molecular weight.

PREPARATION OF THE COPOLYMERS OF THE INVENTION

Example 1

Copolymerization of II from 2a with Acrylamide in Aqueous Solution; Acrylamide:II=82:18

The reaction vessel is charged with 655 g of water, 130.9 g of a 50% strength by weight aqueous acrylamide solution, 0.1 ml of Trilon® C and 35.9 g of the 40.4% strength by weight aqueous solution of compound II obtained in Example 2a and heated to 37° C. 0.02 g of 2,2'-azobis[2-(2-imidazolin-2-yl)propane] dihydrochloride in 20 g of water was introduced into the reaction vessel while maintaining the temperature. After 2 h, an identical amount of initiator was added, and the reaction temperature was maintained for a further 3 h. During this time, the mixture was diluted by portionwise addition of a total of 900 g of water. The mixture was then heated to 50° C. and admixed with a solution of 0.02 g of 2,2'-azobis[2-(2-imidazolin-2-yl)propane] dihydrochloride in 20 g of water, and the temperature was maintained for a further 2 hours. The aqueous solution of the copolymer of the invention obtained in this way had a solids content of 4.7% by weight. The properties of the copolymer are listed in Table 1.

Example 2

Copolymerization of II from 2b with Acrylamide in Aqueous Solution; Acrylamide:II=75:25

A polymerization vessel was charged with 406 g of water, 45 g of acrylamide solution (50% strength by weight), 0.1 ml of Trilons® C, 5 g of a 10% strength by weight aqueous formic acid solution and 7.5 g of the hydrochloride II obtained in Example 2b and heated to 37° C. A solution of 0.0125 g of 2,2'-azobis[2-(2-imidazolin-2-yl)propane] dihydrochloride in 10 g of water was added, and the temperature was maintained for 2 hours. This procedure was repeated twice. Two hours after the last initiator addition, a solution of 0.075 g of 2,2'-azobis[2-(2-imidazolin-2-yl)propane] dihydrochloride in 10 g of water was added, and the temperature was maintained for a further 2 hours. During this time, a total of 500 g of water was introduced into the polymerization vessel. After cooling, an aqueous solution having a solids content of 3.3% by weight was obtained. The properties of the copolymer are listed in Table 1.

Example 3

Copolymerization of II from 2b with Acrylamide in Aqueous Solution

A polymerization reactor was charged with 406 g of water, 39 g of aqueous acrylamide solution (50% strength by weight), 10.5 g of the hydrochloride obtained in Preparation Example 2b and 0.1 ml of Trilon® C and heated to 37° C. The mixture was admixed three times, in 2 h intervals, with a solution of 0.0125 g of 2,2'-azobis[2-(2-imidazolin-2-yl)propane] dihydrochloride in 10 ml of water each time. After a further 2 h, a further 0.075 g of 2,2'-azobis[2-(2-imidazolin-2-yl)propane]dihydrochloride dissolved in 10 ml of water were added. In the course of the reaction, an additional total of 500 ml of water was added. The polymerization is complete after a further 2 h. The resulting polymer solution had a polymer content of 3.0% by weight.

Example 4

Homopolymerization of Monomer II from 2b in Aqueous Solution

A polymerization vessel was charged with 350 g of water and 100 g of the hydrochloride obtained in Preparation Example 2b and heated to 37° C. A solution of 0.3 g of 2,2'-azobis[2-(2-imidazolin-2-yl)propane] dihydrochloride in 50 ml of water was added in the course of 5 h. After addition was complete, the temperature was maintained for a further 3 h. The mixture was then heated to 50° C., and the temperature was maintained for a further 3 h. During this time, the reaction mixture was diluted by portionwise addition of a total of 500 ml of water. The resulting polymer solution had a solids content of 10% by weight.

Example 5

Copolymerization in W/O Emulsion

A polymerization reactor equipped with a centrally arranged propeller stirrer was charged with 315 g of a 60% strength by weight acrylamide solution, 156 g of the 40.4% strength by weight aqueous solution of hydrochloride II obtained in Example 2a and 0.1 ml of Trilon® C. A solution of 40.5 g sorbitan monooleate (Span®R80) in 500 g of paraffin oil (boiling point about 200° C., Isopar®M) was added. A W/O emulsion was prepared from this mixture by intensive stirring (1000 rpm) for 30 min, and nitrogen was passed through the emulsion to remove traces of oxygen. A solution of 0.3 g of 2,2'-azobis(2,2-valeronitrile) in 10 g of paraffin was then added, and the mixture is heated to 45° C. and held at this temperature for 5 h. In this way, an emulsion having a polymer content of 24.6% by weight was obtained.

Trilon® C is a 40% strength by weight solution of pentasodium diethylenetriaminepentaacetate

TABLE 1

| Example | K value[1] | Viscosity[2] [mPas] | $M_W$[3] [g/mol] | Cationic charge density[4] [meq/g] pH 3.5 | pH 7 |
|---|---|---|---|---|---|
| 1 | 212 | 2360 | 15 · 10⁶ | 1.5 | 1.1 |
| 2 | 175 | 1050 46,000* | n.d. | 1.9 | 1.2 |
| 3 | 178 | 1220 | n.d. | 3.2 | 2.0 |
| 4 | 107 | n.d. | n.d. | 8.5 | 5.5 |
| C1 | n.d. | 450** | 1.5 · 10⁶ | 2.5 | 0.3 (pH 5) |

[1]In accordance with Fickentscher (0.1% by weight in 5% strength NaCl solution)
[2]Brookfield viscosity; 1% strength by weight solution, 25° C. or *6% strength by weight solution or **10% strength by weight solution
[3]Weight average molecular weight, light scattering
[4]Determined in accordance with D. Horn by titration with potassium polyvinylsulfate

Comparative Example VI

A reaction vessel was charged with 100 g of a 20% strength by weight aqueous acrylic acid solution and inertized with nitrogen. 0.04 g of peroxodisulfate and 0.04 g of NaHSO₃ were then added, and the mixture was heated to 50° C. for 4 h. The resulting polyacrylic acid solution was admixed with 73 g of water and 6 g of ethyleneimine at room temperature and then heated to 50° C. for 2 h. 10.1 g of a concentrated nitric acid (61% strength by weight) were added, and the temperature was maintained for a further 30 min. Another 6 g of ethyleneimine were added, and after a further hour 10.1 g of concentrated nitric acid were added, and the temperature was maintained for a further 30 min. In this way, a solution with a polymer content of 15.6% by weight was obtained.

PERFORMANCE RESULTS

Investigation of the Retention Properties of the Copolymers of the Invention.

Retention tests were carried out using a Dynamic Drainage Jar (Tappi Standard T-261). The apparatus has been described by K. W. Britt, J. E. Unbehend: New Methods for Monitoring Retention, Tappi Journal, Vol. 59, 1976, p. 67–70. In all tests, the starting material was a paper stock of 40% of pine sulfate pulp, 40% of birch sulfate pulp and 20% of calcium carbonate having a consistency of 5.51 g/l which was composed of 3.54 g of long fibers, 0.97 g of fines and 1.00 g of solids which cannot be ashed (ash fraction). The freeness was 35° SR.

1. Polymer Testing Without Microparticles 500 ml of the paper stock were introduced into a Dynamic Drainage Jar and stirred at 1000 rpm for 10 sec. The respective polymer was added in the form of a 0.02% strength by weight aqueous solution, and the mixture was stirred at 1000 rpm for another 60 sec. A value of 100 ml was then taken off at the outlet of the apparatus and filtered via a white ribbon filter. The weight of the dry filter cake was used to calculate the total retention (First Pass Retention). The heavier the filter cake, the poorer the retention properties of the polymers. For comparison, the test was also conducted without addition of a polymer. Amounts used and results are summarized in Table 2. The filter was then ashed at 500° C. The ash fraction found was used to determine the first pass ash retention which corresponds to the amount of filler retained. The difference is the fines retention. The results are likewise summarized in Table 2.

TABLE 2

| Test No. | Polymer | | Solids [mg] | FPR[2] [%] | Ash [mg] | FPAR[3] [%] |
|---|---|---|---|---|---|---|
| | Example | [% by weight][1] | | | | |
| C1* | — | — | 124 | 77.5 | 95 | 5.0 |
| 2 | 2 | 0.01 | 117 | 78.8 | 86 | 14.0 |
| 3 | 2 | 0.02 | 98 | 82.2 | 73 | 27.0 |
| 4 | 2 | 0.04 | 96 | 82.6 | 65 | 35.0 |
| 5 | 3 | 0.01 | 134 | 75.7 | 91 | 9.0 |
| 6 | 3 | 0.02 | 110 | 80.0 | 75 | 25.0 |
| 7 | 3 | 0.04 | 102 | 81.5 | 65 | 35.0 |
| C8* | C1 | 0.01 | 120 | 78.2 | 93 | 7.0 |
| C9* | C1 | 0.02 | 123 | 77.7 | 92 | 8.0 |
| C10* | C1 | 0.04 | 127 | 77.0 | 93 | 7.0 |

[1]% by weight of polymer, based on solids content in pulp
[2]FPR: total retention (First Pass Retention)
[3]FPAR: ash retention (First Pass Ash Retention)
*Comparative tests 2. Investigation of Retention Effect of the Polymers in the Presence of Microparticles (Bentonite)

500 ml of the paper stock described in 1. were introduced into a Dynamic Drainage Jar and then stirred at 1500 rpm for 10 sec. 5.5 ml of a 0.02% strength by weight aqueous solution of the respective polymer were added, and the mixture was stirred at 1500 rpm for 60 sec. The proportion of the polymer, based on solids in the pulp, was 0.04% by weight. The stirring speed was reduced to 1000 rpm, and 0.3 ml or 0.6 ml, respectively, of a 2% strength by weight suspension of bentonite (Hydrocoll OT, cf. EP-A 235 893) in water were added, and the mixture was stirred at 1000 rpm for another 30 sec. 100 ml of liquid were then taken off at the outlet of the apparatus and filtered via a white ribbon filter. Total retention and ash retention were determined as described in 1. The results are summarized in Table 3.

TABLE 3

| Test No. | Polymer | | Bentonite [% by weight] | Solids [mg] | FPR[2] [%] | Ash [mg] | FPAR[3] [%] |
|---|---|---|---|---|---|---|---|
| | Example | [% by weight][1] | | | | | |
| C11* | — | — | — | 126 | 77.1 | 92 | 8.0 |
| 12 | 2 | 0.04 | 0.2 | 91 | 83.5 | 54 | 46.0 |
| 13 | 2 | 0.04 | 0.4 | 84 | 84.8 | 54 | 46.0 |
| 14 | 3 | 0.04 | 0.2 | 95 | 82.8 | 60 | 40.0 |
| 15 | 3 | 0.04 | 0.4 | 91 | 83.5 | 58 | 42.0 |
| C16* | C1 | 0.04 | 0.2 | 119 | 78.4 | 82 | 18.0 |
| C17* | C1 | 0.04 | 0.4 | 120 | 78.2 | 91 | 9.0 |

[1]% by weight of polymer, based on solids content in pulp
[2]FPR: total retention (First Pass Retention)
[3]FPAR: ash retention (First Pass Ash Retention)
*Comparative tests 3. Investigation of Retention Action of the Polymers of the Invention in the Presence of Bentonite in a Paper Stock Which Comprises Polyaluminum Chloride (PAC).

The paper stock described in 1. and 2. was modified to contain, in addition to the birch sulfate pulp, the pine sulfate pulp and the filler, 2% by weight of polyaluminum chloride (commercial product), based on the abovementioned constituents.

The investigation was carried out as described in 2., i.e. 500 ml of paper stock, polymer and bentonite were in each case combined as described in 2. and stirred under the conditions described in 2.

Materials used and total retention and ash retention found are listed in Table 4.

TABLE 4

| Test No. | Polymer | | Bentonite [% by weight] | Solids [mg] | FPR[2] [%] | Ash [mg] | FPAR[3] [%] |
|---|---|---|---|---|---|---|---|
| | Example | [% by weight][1] | | | | | |
| C18* | — | — | — | 123 | 77.7 | 94 | 6.0 |
| 19 | 2 | 0.04 | 0.2 | 102 | 81.5 | 66 | 34.0 |
| 20 | 2 | 0.04 | 0.4 | 107 | 80.6 | 68 | 32.0 |
| 21 | 3 | 0.04 | 0.2 | 106 | 80.8 | 70 | 30.0 |
| 22 | 3 | 0.04 | 0.4 | 110 | 80.0 | 70 | 30.0 |
| C23* | C1 | 0.04 | 0.2 | 122 | 77.9 | 90 | 10.0 |
| C24* | C1 | 0.04 | 0.4 | 125 | 77.3 | 91 | 9.0 |

[1]% by weight of polymer, based on solids content in pulp
[2]FPR: total retention (First Pass Retention)
[3]FPAR: ash retention (First Pass Ash Retention)
*Comparative tests

We claim:
1. A process for preparing water-soluble copolymers having oligoalkyleneimine side chains of formula I,

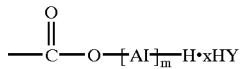
(I)

where

is a linear or branched oligoalkyleneimine chain comprising m alkyleneimine units, where m is an integer from 1 to 20, and the number average of m in the oligoalkyleneimine side chains is at least 1.5, Y is the anion equivalent of a mineral acid, and x is $0 \leq x \leq m$, which comprises copolymerizing ethylenically unsaturated monomers M, comprising:

from 5 to 50% by weight of at least one monomer A of formula II or an oligomer mixture thereof

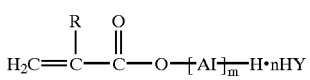
(II)

where

, m and Y are as defined above,

R is hydrogen or $C_1$–$C_4$-alkyl, and n is $1 \leq n \leq m$; and from 50 to 95% by weight of at least one neutral or cationic, water-soluble monomer B which is monoethylenically unsaturated, and up to 10% of one or more monomer C which are different from said monomers A and said water-soluble, monoethylenically unsaturated monomers B, in an aqueous polymerization medium in the presence of an initiator which triggers the free-radical polymerization of the monomers M.

2. The process as claimed in claim 1, wherein the monomers to be polymerized do not comprise any monomers C.

3. The process as claimed in claim 1, wherein R in formula II is methyl.

4. The process as claimed in claim 1, wherein the oligoalkyleneimine chain

is derived from ethyleneimine.

5. The process as claimed in claim 1, wherein the monomers A comprise an oligomer mixture comprising less than 25% by weight, based on the total weight of the monomers A, of compounds of the formula II where m=1.

6. The process as claimed in claim 1, wherein the sole monomer B used is acrylamide.

7. The process as claimed in claim 1, wherein the polymerization is carried out in water.

8. The process as claimed in claim 1, wherein the polymerization is carried out in an aqueous polymerization medium, which is dispersed in the form of a water-in-oil emulsion in a liquid organic medium which is inert toward the polymerization conditions.

9. A copolymer having oligoalkyleneimine side chains of the formula I as defined in claim 1 and a weight average molecular weight $M_W \leq 2,000,000$, which comprises from 5 to 50% by weight of at least one monomer A, from 50 to 95% by weight of at least one neutral or cationic; water-soluble monomer B which are monoethylenically unsaturated, and, optionally up to 10% of at least one monomer C which are different from said monomers A and water-soluble, monoethylenically unsaturated monomers.

10. The copolymer as claimed in claim 9, comprising only monomers A and B.

11. The homopolymer having oligoalkyleneimine side chains of the formula I as defined in claim 1, which is exclusively composed of the monomers A.

12. The copolymer as claimed in claim 9, wherein the number average of m is in the range from 2.1 to 8.

13. The copolymer as claimed in claim 9, wherein structural units derived from monomers A of the formula II where m=1 are present in a proportion of less than 25% by weight, based on the total weight of all structural units derived from monomer units A.

14. A monomer mixture of formula II

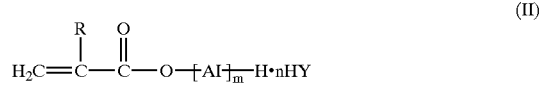

where R,

Y and n are as defined in claim 1 and the number average of m is at least 2.1.

15. An aqueous monomer solution comprising at least one monomer or a monomer mixture of claim 14.

16. The homopolymer as claimed in claim 11, wherein the number average of m is in the range from 2.1 to 8.

17. The homopolymer as claimed in claim 11, wherein structural units derived from monomers A of the formula II where m=1 are present in a proportion of less than 25% by weight, based on the total weight of all structural units derived from monomer units A.

18. A method of making paper from paper stock, said method comprising adding at least one copolymer as defined in claim 9 to said paper stock.

19. A method of making paper from paper stock, said method comprising adding at least one homopolymer as defined in claim 11 to said paper stock.

* * * * *

UNITED STATES PATENT AND TRADEMARK OFFICE
CERTIFICATE OF CORRECTION

PATENT NO. : 6,562,926 B1  Page 1 of 1
DATED : May 13, 2003
INVENTOR(S) : Juergen Decker et al.

It is certified that error appears in the above-identified patent and that said Letters Patent is hereby corrected as shown below:

Column 21,
Line 28, "$M_W \leq$" should read -- $M_W \geq$ --

Signed and Sealed this

Thirtieth Day of December, 2003

JAMES E. ROGAN
*Director of the United States Patent and Trademark Office*